(No Model.)
A. LINDEMANN.
PAN.
No. 566,522.　　　　　　Patented Aug. 25, 1896.
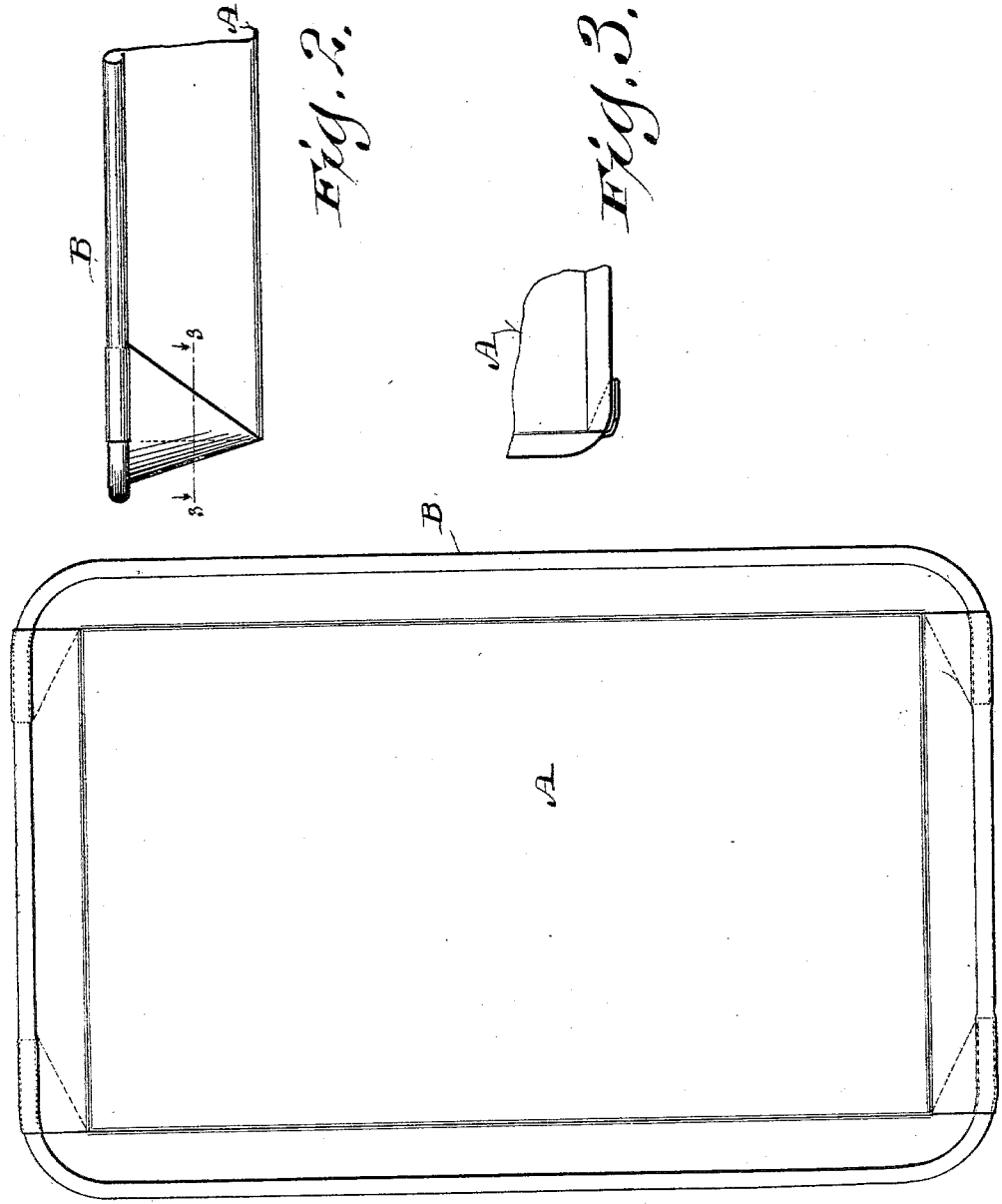

UNITED STATES PATENT OFFICE.

AUGUST LINDEMANN, OF MILWAUKEE, WISCONSIN.

PAN.

SPECIFICATION forming part of Letters Patent No. 566,522, dated August 25, 1896.

Application filed August 21, 1895. Serial No. 560,047. (No model.)

*To all whom it may concern:*

Be it known that I, AUGUST LINDEMANN, a citizen of the United States, and a resident of Milwaukee, in the county of Milwaukee and State of Wisconsin, have invented certain new and useful Improvements in Pans; and I do hereby declare that the following is a full, clear, and exact description thereof.

Heretofore in the manufacture of angular sheet-metal pans it has been common to form the same from one or more pieces, but so far as I am aware such pans have been square-cornered and not continuous in the matter of edge. It has also been common to stiffen the pans by wiring their open corners, an operation that adds materially to cost of production without attainment of the desired result, because, the wire being in short pieces, they only stay limited portions of the pans. Consequently the latter, especially those of the larger sizes, bend out of shape when in use. Owing to lack of uniformity in the wires, the pan-corners are not all alike, and therefore the pans themselves are frequently out of square, while if the wiring be omitted said pans are very limber. Some pans are wired all around, but such wiring is costly and only serves to stiffen the pans, the corners of the latter being open and their edges lacking in continuity. Whether wired or not, the pans above described have sharp edges at their corners and are consequently dangerous.

In view of the foregoing, my invention has for its object to cheapen the production of angular pans formed from sheet metal, as well as to overcome the defects existing in this class of goods as heretofore furnished the trade; and it consists of such a pan formed with curved corners and a continuous edge, as will be hereinafter more fully described with reference to the accompanying drawings, and subsequently claimed.

In the drawings, Figure 1 represents a plan view of a pan constructed according to my invention; Fig. 2, an end elevation of a portion of the pan, and Fig. 3 a horizontal section on line 3 3 of the preceding figure.

Referring by letter to the drawings, I show my improved angular sheet-metal pan having a continuous edge B, this pan being formed from sheet metal, particular attention being called to the fact that I make a distinction between pans that are formed and those that result from a drawing operation, as the latter are made from heavy plates instead of sheet metal, as understood by the trade.

In forming a pan according to my invention I may utilize one or more pieces of the sheet metal, but in any event I provide for more than ordinary lap at the corners, and also cut the metal so as to insure of said corners being curved instead of angled. The pan-blank is bent up to form lap-corner sides and ends, after which the edges of these sides and ends are outturned in order to stiffen the pan and at the same time lap said sides and ends at the corner-tops, so as to give the finished product a continuous upper edge. As herein shown it is preferable to roll over the edges of the pan sides and ends to form stiffening beads, the latter telescoping at the corner-tops of the pan to form the continuous upper edge.

The offset edge of the finished pan being continuous, no openings or sharp corners are left, while at the same time said pan is stiffer than those of common knowledge having wired corners, and being of the same material throughout its uniformity at all points is assured.

The improved pan herein described is not only pleasing in the matter of shape, but is easy to clean, and material baked therein is not liable to stick or break at the corners when being dislodged, while at the same time there is more uniformity in the baking because of the curved corner surfaces of said pan.

Having now fully described my invention, what I claim as new, and desire to secure by Letters Patent, is—

1. A pan constructed from a blank of sheet metal bent up to form sides and ends, the edges of the sides and ends being rolled over to form stiffening-beads at the upper edge of the pan and the said beads telescoping at the corners of the pan so as to give to the same a continuous upper edge, substantially as described.

2. A pan constructed from a blank of sheet metal bent up to form lap-corner sides and ends, the edges of the sides and ends being turned outward and lapped at the corner-tops to thereby stiffen the pan and give to the same a continuous upper edge substantially as described.

In testimony that I claim the foregoing I have hereunto set my hand, at Milwaukee, in the county of Milwaukee and State of Wisconsin, in the presence of two witnesses.

AUGUST LINDEMANN.

Witnesses:
N. E. OLIPHANT,
GEO. W. YOUNG.